Figure 1:
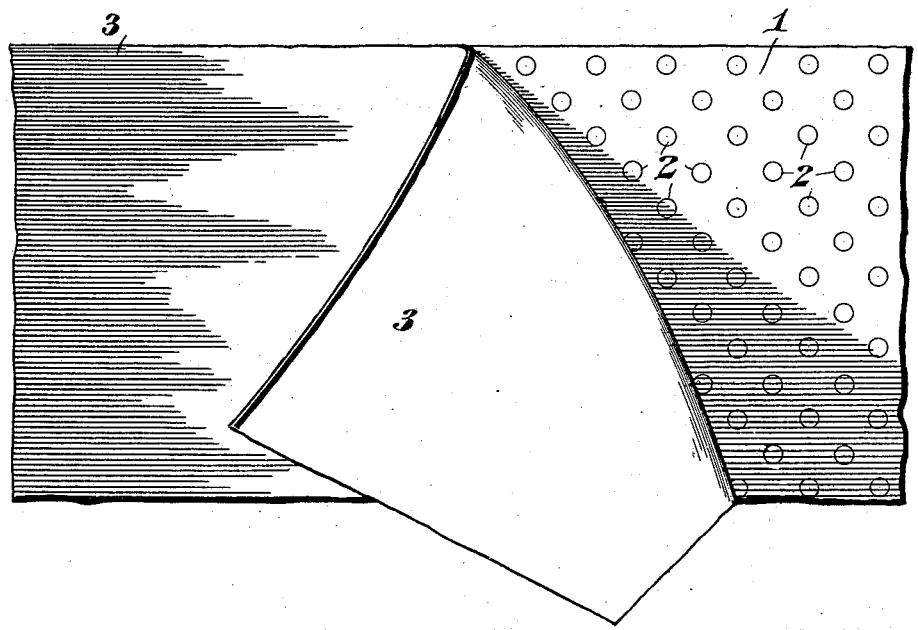

No. 665,931. Patented Jan. 15, 1901.
A. B. PRATT.
SHEET PACKING.
(Application filed Oct. 31, 1900.)

(No Model.)

Albert B. Pratt, Inventor

Witnesses

UNITED STATES PATENT OFFICE.

ALBERT B. PRATT, OF SOMERVILLE, MASSACHUSETTS.

SHEET-PACKING.

SPECIFICATION forming part of Letters Patent No. 665,931, dated January 15, 1901.

Application filed October 31, 1900. Serial No. 35,051. (No model.)

*To all whom it may concern:*

Be it known that I, ALBERT B. PRATT, a citizen of the United States, residing at Somerville, in the county of Suffolk and State of Massachusetts, have invented a new and useful Sheet-Packing, of which the following is a specification.

My present invention relates to sheet-packing of novel composition; but in order that its utility may be better understood I will first outline the development of the art which has culminated in the production of my packing.

It has always been necessary to provide packing of some character between the faces of joints which are necessarily steam-tight. The most usual and ordinary forms of such packing are composed of rubber, metal, or a combination of both. These joint-closures or packings were first formed exclusively of rubber; but gaskets of this character when continuously subjected to heat disintegrate more or less rapidly and either spread to an extent which will open the joint or become brittle and crack. These results led to the introduction of metal packings; but these, except in complicated and expensive forms, are inefficient and are not available as closures for face-joints, because it is practically impossible to fit these metal packings with sufficient nicety to secure absolutely steam-tight joints, except where the contacting faces are disposed in angular relation. The facts related then led to the production of a combined rubber and metal packing-sheet which comprehended a plurality of thin rubber sheets and an intermediate woven-wire layer. This was a distinct advance, because the wire sheet gave body to the packing and prevented it from stretching, while permitting it to be sufficiently pliable to adapt itself to the nature of the joint-faces. Many objections were urged against this form of packing, however, because the surface was exceedingly uneven and after comparatively little use the wires of the intermediate sheet would become exposed. These objections were overcome in great measure by the subsequent employment of a thin metal sheet, to the opposite faces of which the rubber was vulcanized; but the adhesion between the metal and rubber was imperfect, and this combination resulted in the blistering of the rubber and in its gradual separation from the metal core. Prior to my invention the latest advance in the art, so far as I am aware, was directed to the elimination of this tendency of the rubber to pull away from the sheet metal, and with this end in view the pure-rubber sheets were substituted by a compound of rubber and metallic oxids, which latter did actually serve to strengthen the union. Up to this point, however, the sheet-packing is open to many objections, because while the interposition of a metal sheet does overcome many valid objections to the use of the pure rubber the tendency of the metal and rubber layers to separate practically precluded the employment of these composite packings and the introduction of the metallic oxids into the compound resulted in reviving an objection urged against the original solid rubber packings—to wit, the spreading and cracking of the rubber facings—that is to say, the incorporation of the metallic oxids is injurious to the rubber, and while it causes the latter to adhere more securely to the metal plate it causes the rubber to scale and crack under the continued heat to which these packings are ordinarily subjected.

The object of my invention, therefore, is to produce a sheet-packing composed of a pliable metal sheet or plate having pure-rubber facings or covering-layers which are caused to adhere closely to the plate without the use of metallic oxids and in a manner to preclude the possibility of either the cracking of the rubber or of its separation from the metal when subjected to the action of excessive heat for a considerable period.

To the accomplishment of this object the invention consists in providing a non-resilient pliable foraminous metal sheet or plate and in compressing thin rubber facing-sheets upon the opposite faces of the metal under such pressure as will force the rubber into the openings in the plate and into such union as will form a series of transverse ties or binders passing through the plate and connecting the rubber layers to prevent the separation of the latter, the employment of the flat metal plate and the attachment of the rubber sheets by compression serving to leave the exposed faces of the sheets perfectly smooth and plain, and therefore adapted for use upon face-joints or other forms of what is known in the art as "smooth work."

Figure 2:
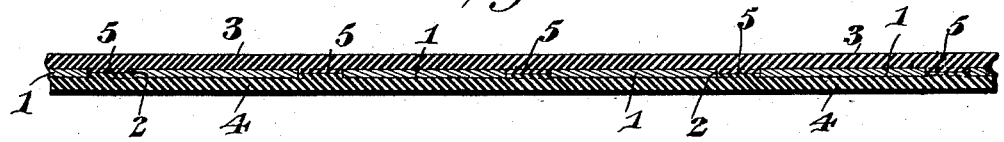
Figure 3:
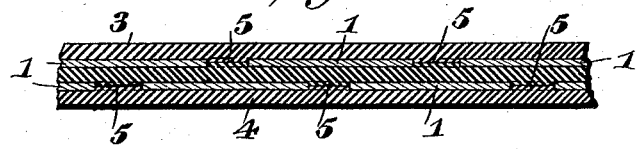

In the accompanying drawings, in which I have illustrated a preferred embodiment of my invention, Figure 1 is a view of my sheet-packing with one of the rubber layers or facings turned back to disclose the foraminous core-plate. Fig. 2 is a sectional view through the sheet, showing a single core-plate; and Fig. 3 is a view of a further development of the invention, which comprehends the utilization of a greater number of rubber layers and intermediate metal cores.

Referring to the numerals employed to designate corresponding parts in the several views, 1 indicates a thin plate or core of pliable inelastic metal—as, for instance, lead—rendered foraminous by a number of perforations or apertures 2. Upon the opposite faces of this foraminous pliable core-plate are spread a pair of thin rubber layers or facings 3 and 4. The layers thus related are passed between compression-rolls or are otherwise subjected to sufficient pressure to force the rubber of both facing layers into the perforations 2 and to adhere. This adhesive union, if produced by sufficient pressure, effects an almost cohesive union between the rubber layers, and thus forms a great number of rubber ties or binders 5, passing through the plate and connecting the rubber layers disposed against the opposite faces thereof. At the same time the rolling of the rubber to produce the union described will serve to render the outer faces of the sheet-packing perfectly smooth and unbroken, and as the rubber binders or ties passing through the plate are formed by the surplus rubber incident to the compression the continued use of the packing will not cause the rubber to sink at various points, as is the case where woven-wire or similar core-plates are used, and the packing may therefore be used continuously and effectively until the facings have actually worn away from the metal.

If desired, the rubber may be vulcanized after the sheet-packing has been formed in the manner stated, in which event the union between the facing-sheets will become absolutely cohesive.

From the foregoing it will appear that I have produced a sheet-packing comprising a foraminous metal sheet or core, to the faces of which rubber facings are united securely without necessity for the employment of metallic oxids; but while the present embodiment of my invention is believed at this time to be preferable I desire to reserve to myself the right to effect such modifications of the structure shown as may be properly comprehended within the scope of the protection prayed.

What I claim is—

1. As a new article of manufacture, sheet-packing composed of a flat, foraminous, pliable metal core-plate, and rubber facings covering the opposite sides of the plate and united through the openings therein.

2. As a new article of manufacture, sheet-packing comprising a flat, smooth-surfaced, foraminous, pliable metal sheet or core-plate and thin facing-sheets of rubber compressed upon the opposite sides of said plate, the material of each of said facing-sheets being forced into the openings in the plate and into union with the material of the other sheet to produce a sheet-packing having plain, smooth faces and comprising rubber facing-sheets connected to an intermediate core-plate by rubber binders extending through said plate.

In testimony that I claim the foregoing as my own I have hereto affixed my signature in the presence of two witnesses.

ALBERT B. PRATT.

Witnesses:
WM. S. TOWN,
ALBERT SMITH.